United States Patent [19]

Zurek et al.

[11] Patent Number: 5,576,218
[45] Date of Patent: Nov. 19, 1996

[54] METHOD FOR THERMAL CYCLING NUCLEIC ACID ASSAYS

[75] Inventors: Thomas F. Zurek, River Forest; Kathleen A. Hanley, Gurnee; Curtis J. Pepe, McHenry, all of Ill.

[73] Assignee: Abbott Laboratories, Abbott Park, Ill.

[21] Appl. No.: 422,688

[22] Filed: Apr. 14, 1995

Related U.S. Application Data

[63] Continuation of Ser. No. 179,845, Jan. 11, 1994, abandoned.
[51] Int. Cl.$^6$ ............................. G01N 1/00; G01N 25/00
[52] U.S. Cl. ............................. 436/174; 436/50; 436/52; 436/53; 436/55; 436/157; 422/82.12; 422/93; 435/285.1; 435/286.1; 935/85; 935/88
[58] Field of Search ................................. 436/52, 53, 50, 436/55, 157, 174; 422/81, 82, 82.12, 93; 935/85–88; 165/12, 26, 30; 236/13; 435/285.1, 286.1, 287.1, 809

[56] References Cited

U.S. PATENT DOCUMENTS

| | | | |
|---|---|---|---|
| 3,030,024 | 4/1962 | Joesting | 236/13 |
| 3,053,454 | 9/1962 | Waterfill | 236/13 |
| 3,801,467 | 4/1974 | Nobe et al. | 435/809 X |
| 4,706,736 | 11/1987 | Gyori | 165/30 |
| 4,865,986 | 9/1989 | Coy et al. | 435/290 |
| 4,868,122 | 9/1989 | Kominek et al. | 435/285 |
| 4,963,499 | 10/1990 | Stockton et al. | 436/147 |
| 4,981,801 | 1/1991 | Suzuki et al. | 435/290 |
| 5,028,541 | 7/1991 | Kiel et al. | 435/290 X |
| 5,038,852 | 8/1991 | Johnson et al. | 236/46 R X |
| 5,123,477 | 6/1992 | Tyler | 935/85 X |
| 5,133,936 | 7/1992 | Umetsu et al. | 435/290 X |
| 5,176,203 | 1/1993 | Larzul | 435/290 X |
| 5,187,084 | 2/1993 | Hallsby | 935/85 X |
| 5,281,516 | 1/1994 | Stapleton et al. | 435/290 X |
| 5,455,175 | 10/1995 | Wittwer et al. | 435/286.1 |

FOREIGN PATENT DOCUMENTS

| | | | |
|---|---|---|---|
| 3839162 | 5/1990 | Germany | 435/290 |
| 4330272 | 11/1992 | Japan | 435/290 |
| WO-A-9005947 | 5/1990 | WIPO . | |

OTHER PUBLICATIONS

Wittwer, C. T., et al., *Automated Polymerase Chain Reaction in Capillary Tubes with Hot Air*, Nucleic Acids Research, vol. 17, No. 11, 1989, pp. 4353–4357.

Primary Examiner—Jill Warden
Assistant Examiner—Maureen M. Wallenhorst
Attorney, Agent, or Firm—Paul D. Yasger; Thomas D. Brainard

[57] ABSTRACT

The method for thermal cycling of nucleic acid assays includes a blended fluid stream produced from a plurality of constant velocity, constant volume, constant temperature fluid streams wherein to provide a variable temperature, constant velocity, constant volume fluid stream which is introduced into a sample chamber for heating and cooling samples contained therein. By diverting and altering the ratio of the constant temperature fluid streams relative to one another, the blended fluid stream is rapidly variable in temperature, providing for almost instantaneous temperature change within the environment defined by the sample chamber.

30 Claims, 4 Drawing Sheets

METHOD FOR THERMAL CYCLING NUCLEIC ACID ASSAYS

This application is a continuation of U.S. patent application Ser. No. 08/179,845, filed Jan. 11, 1994 now abandoned.

BACKGROUND OF THE INVENTION

1. Field of the Invention

The invention is generally related to a method and apparatus for thermal cycling assay samples and is specifically directed to a method and apparatus utilizing a constant volumetric fluid flow for thermal cycling assay samples in a sample carrier.

2. Description of the Prior Art

Most prior art thermal cycling systems require variable temperature blocks or require movement of samples between fixed temperature baths. Both of these systems have a number of disadvantages. The block cyclers are inefficient, requiring an undesirable amount of energy and time to operate. For example, the only practical means of increasing ramp speed for thermal cycling a sample in a block configuration is to design the sample tube to maximize its wall exposure to the heat exchanger. While this may accomplish faster ramp times, the basic inefficiencies of the system are not corrected. Further, it is far more desirable to design a more efficient system which will accommodate the many sample tubes already in the field. Therefore, it remains desirable to provide a thermal cycling system that can achieve the required cycle and ramp time without reconfiguring the sample tubes or vials.

The fixed temperature baths are undesirable because of the primary requirement that the samples need to be moved between baths in order to complete the cycle. This also has an undesirable impact on ramp speed variability. Further, in order to eliminate positional temperature variation, it is often required that the sample size be severely limited. For example, when a bath of silicon oil is utilized, the viscosity of the oil reduces convection sufficiently to inhibit adequate heat transfer to the inner samples in an array. This requires that the bath use fewer samples.

In the known prior art, it is often desirable to have a sample array or rack of up to one-hundred sample vials, typically ninety-six. The most commonly used vials are standard 0.5 milliliter microfuge tubes, such as Eppendorf® brand tubes. In order to meet the positional temperature requirements of a silicon bath using standard vials, it is often required to reduce the sample array by as much as fifty percent of normal sample sizes. In addition, the silicon oil adheres to the sample vials, creating a waste and work environment problem. Without proper removal of the oil from the vials prior to removal of the vials from the bath, the work area can actually become hazardous. The added time involved in properly removing the oil from the vials adds further to the inefficiency of this system.

Other prior art systems include sophisticated equipment to overcome the problems of either the heater blocks or the bath type of thermal cycling systems. For example, as shown in U.S. Pat. No. 4,706,736, entitled "Multi-Zone Heater Arrangement for Controlling the Temperature of a Flowing Medium", issued to S. A. Guiori on Nov. 17, 1987, a multi-zone heater arrangement controls the temperature of a gaseous medium such as air. As the air moves through the multi-zone heater, it is heated to selected temperatures, as required, to provide even heating of the air for various uses. Another mechanism for controlling the flow and temperature of an air stream is illustrated in U.S. Pat. No. 4,868,122 entitled "Arrangement for Drawing Permanent Forms of Microorganisms" issued to J. Kominek, et al., on Sep. 19, 1989. Both of these devices deal more with the even heating and distribution of a fluid or gaseous medium such as air, rather than with the rapid ramp cycling of the medium.

U.S. Pat. No. 4,963,499 entitled "Method for the Calorimetry of Chemical Processes", issued to G. Stockton, et al., on Oct. 16, 1990, discloses a calorimeter for measuring the thermodynamic and kinetic characteristics of chemical reactions and deals more specifically with the reaction of the sample to heating and cooling cycles. This patent is not specifically directed to a method and apparatus for providing rapid, accurate thermal cycling of assays samples.

U.S. Pat. No. 4,981,801 entitled "Automatic Cycling Reaction Apparatus and Automatic Analyzing Apparatus Using the Same", issued to Y. Suzukai, et al., on Jan. 1, 1991, discloses a mechanism for carrying out an enzymatic cycling reaction, including a turntable arranged in a reaction tank, with a number of reaction vessels being arranged on the turntable. The device discloses an antifreeze liquid circulatable through the reaction tank, a heater for heating the antifreeze liquid and a refrigerator for cooling same. A switching valve selectively passes the antifreeze through either the heater or the cooler. The temperature of the antifreeze liquid is controlled to create an enzymatic cycling reaction temperature so as to perform the enzymatic cycling reaction simultaneously for all the liquids contained in all of the reaction vessels for a desired period. This device discloses a mechanism for controlling the temperature of the fluids which is in direct contact with the reaction vessels. However, the cycle time is limited by the ability to heat and cool the fluid as it is circulated through the system.

All of the prior art devices rely on heating and cooling cycles to cool the bath or fluid environment in which the vessels are contained. Thus, the ramp time is naturally controlled by the ability to heat and cool the bath fluids, as well as the vessels and transfer lines containing the fluids. When such systems are used for certain types of nucleic acid cycling, fast ramp speeds can only be achieved by increasing the capacity of the heaters and coolers associated with the fluids, greatly increasing the costs and reducing the efficiency of operation. Typically, faster ramp time requires an inefficient high energy heater, since response time is valued more than energy issues. In such cases, high power systems are utilized to alter temperature in a quick response cycle. On the other hand, highly efficient systems generally have slow intrinsic ramp speeds since the temperature changes are controlled using a low energy level.

SUMMARY OF THE INVENTION

The subject invention is directed to a novel thermal cycling device wherein various fluid streams, each held at a fixed constant temperature, are mixed to alter the fluid temperature in the reaction sample chamber.

In the preferred embodiment, a plurality of constant volumetric flow fluid streams are provided in parallel. Each stream is of a different preselected temperature. Typically, a superheated stream (above maximum sample temperature) and a chilled or ambient stream are provided. Each stream is independently introduced into a diverter/mixer, where varying ratios are combined to produce an output stream of a selected intermediate temperature at a volumetric flow rate equal to the sum of the two individual input streams.

The term "constant volumetric flow" refers to the movement of a substantially fixed volume of fluid per unit time. The mass of this volume is dependent on the density of the fluid, but is unimportant to the invention as constant volume is desired. The volumetric flow rate is substantially constant moving in and out of the sample chamber regardless of the source. As is understood by those skilled in the art, absolute constancy is not achievable due to system inefficiencies and to variations in viscosity, humidity, temperature and other like factors. However, deviations resulting from these factors are of no consequence to the operation of the invention.

The present invention permits the use of constant temperature fluid streams to instantaneously control the temperature of a blended output stream. This allows the use of low energy heat exchangers which may have slow intrinsic ramp speeds since only a constant temperature output is required in order to produce each component of the blended stream. Rapid ramping of samples can nevertheless be obtained by instantaneously gating and blending the component streams, without having to alter the temperature of the entire body of bathing fluid. Therefore, the method and apparatus of the subject invention can greatly reduce equipment costs and energy consumption, while at the same time increasing the overall responsiveness of the system.

In the preferred embodiment of the invention, the fluid medium of choice is air. Typically, a first stream of air is heated to a selected temperature, substantially above the highest target temperature desired for the reaction sample. At least one additional stream of air is provided, which is typically substantially lower than the coolest target temperature required for the sample. Controlled, variable ratios of the heated air stream and the cooled air stream are then introduced into a mixing chamber via gating means for producing a blended air stream. By controlling the gate and the ratio of the first air stream to the second air stream, almost instantaneous changes in temperature of the blended air stream can be achieved, providing similarly responsive temperature changes in the sample chamber.

In one aspect of the invention, the blended temperature streams may be set at the desired target level and introduced directly into the controlled environment of the sample for altering the control temperature. In another aspect of the invention, the ramp speed for altering the temperature of the sample can be further accelerated by utilizing a blended air stream initially at a temperature substantially beyond the target temperature for the sample. This permits the sample to rapidly heat to a point near its target temperature, at which point the blended air stream is altered to maintain a target temperature. The sequencing of this alternative is dependent upon the hysteresis of the bath vessel and the sample. As the sample approaches the target temperature, the blended air streams are adjusted to define a chamber temperature adapted for maintaining the sample at the target temperature for the specified period of time. After the sample has been held at the target temperature for the specified period of time, the blended air stream is cooled by changing the ratio of heated air to cooled air, again almost instantaneously changing the chamber temperature, permitting the sample temperature to be rapidly altered.

By utilizing the thermal cycling method and apparatus of the subject invention, it has been found that the sample can be held at the target temperature for periods of less than one second in duration by diverting the constant temperature air streams and controlling the ratios thereof to control the blended air stream which is introduced into the sample chamber.

Utilizing air as the medium of choice eliminates disposal and recycling problems since room air can be used for both air streams. One particular advantage of the subject invention is the elimination of inefficient, high energy heating/cooling systems since the slow intrinsic ramp time of such a heating and cooling system is no longer an issue. The invention has been found to be particularly useful in samples where ramp time is a critical factor and temperature change has to be accomplished in very precise, controlled time intervals.

It is, therefore, an object and feature of the subject invention to provide a thermal cycling device which permits rapid, controlled ramping of assay samples and rapid temperature change of sample environments.

It is another object and feature of the subject invention to provide a method and apparatus for thermal cycling assay samples utilizing fluid streams of constant temperature mixed in variable ratios to control a variable environmental temperature for the sample. It is yet another object and feature of the subject invention to provide a thermal cycling device adapted for utilizing air as the transfer medium, reducing recirculating and waste disposal requirements.

It is a further object and feature of the subject invention to provide a thermal cycling device wherein the heat temperature of the heat transfer medium is controlled by mechanical means, reducing the requirement to change the temperature of the medium through expansion and contraction techniques, greatly reducing the amount of energy required to accomplish a thermal cycle.

It is yet another object and feature of the subject invention to provide for super heating and super cooling of samples by selectively exposing the samples to a temperature beyond the sample target temperature to increase ramp speed.

Other objects and features of the invention will be readily apparent from the accompanying drawings and detailed description of the preferred embodiments.

DETAILED DESCRIPTION OF THE PREFERRED EMBODIMENTS

Figure 1:
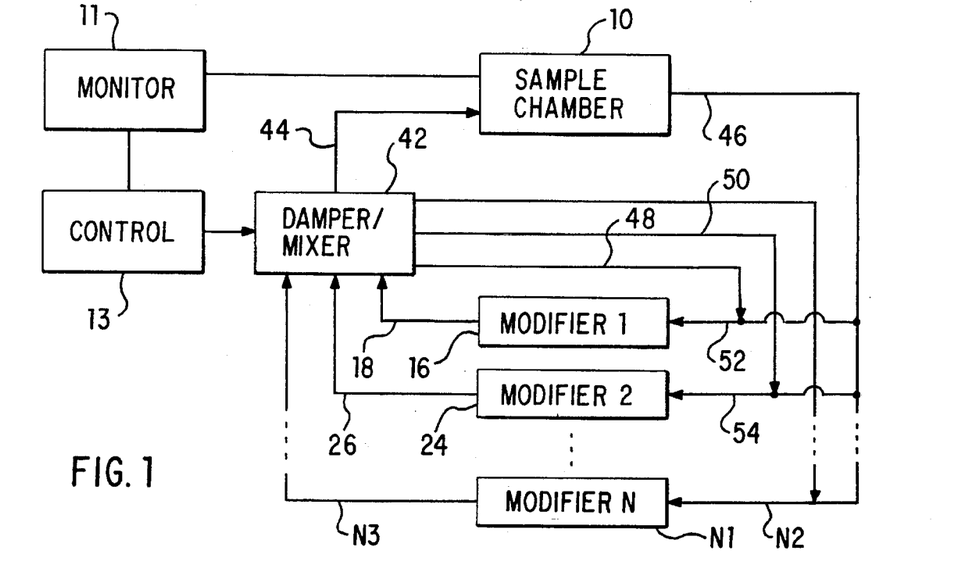
FIG. 1 is a flow diagram of a fluid control circuit in accordance with the subject invention.
Figure 2:
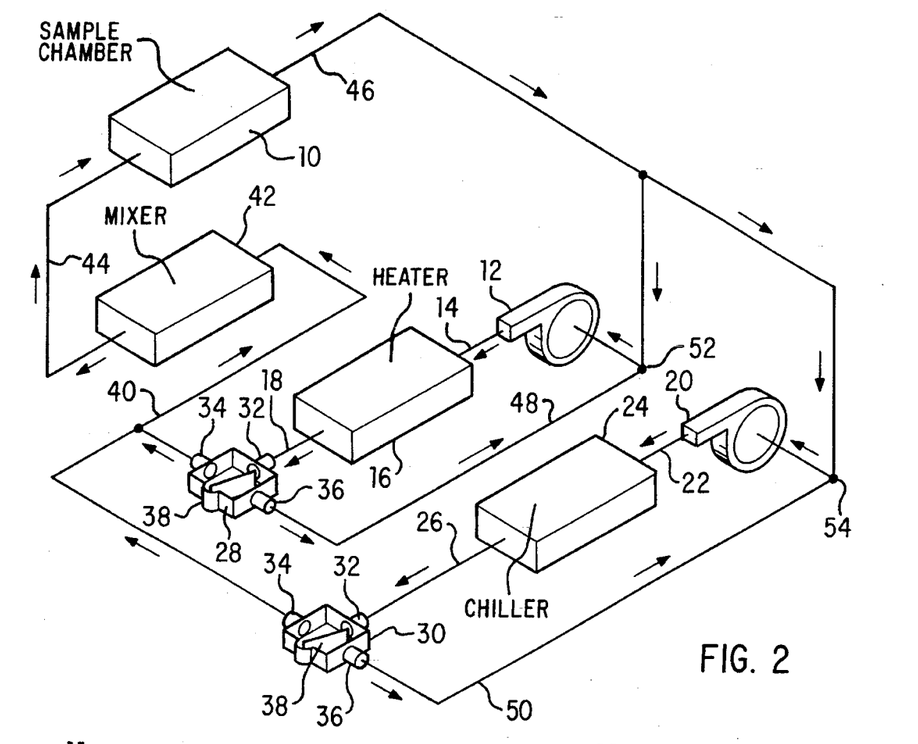
FIG. 2 is diagrammatic illustration of a first embodiment of the subject invention.
Figure 3:
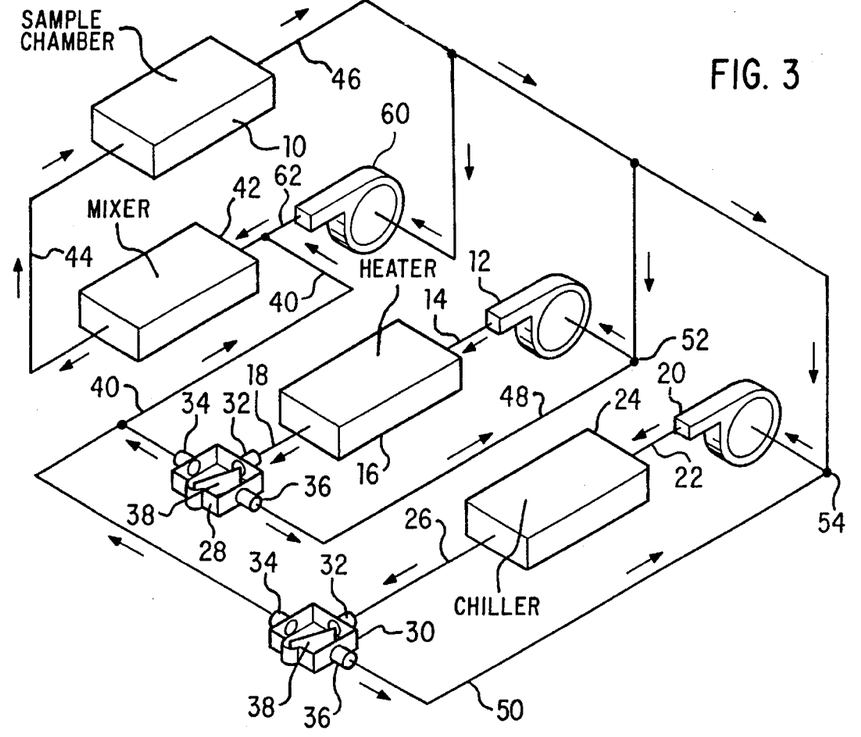
FIG. 3 is a view similar to FIG. 2 and illustrates an alternative embodiment of the subject invention.
Figure 4:
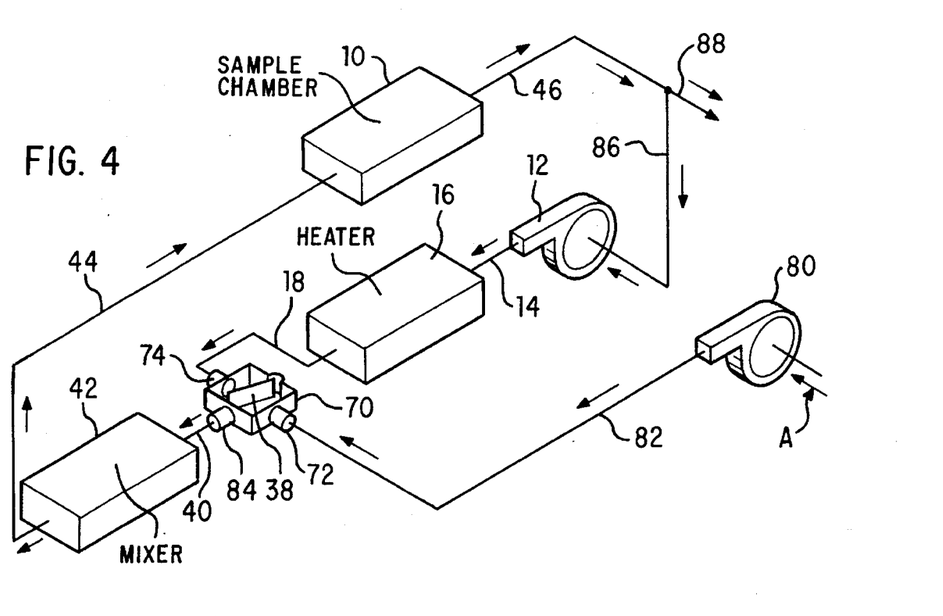
FIG. 4 is a view similar to FIG. 2 and illustrates another alternative embodiment of the invention.

A diagrammatic flow chart for carrying out the subject invention is shown in FIG. 1. Specific circuits in accordance with FIG. 1 are shown in FIGS. 2, 3 and 4, with FIG. 3 representing the current preferred embodiment. As shown in FIG. 1, and common to all embodiments is a cycling chamber or sample chamber 10 for holding a plurality of assay samples. "Sample" as used herein refers to a test sample, usually combining a specimen from a patient with various test reagents. Typically, the sample chamber 10 will carry up to forty-eight or ninety-six samples for each cycle. Treated input fluid is introduced into chamber 10 via line 44 at a constant volumetric flow rate. The fluid will control the temperature within the chamber 10 and, likewise the sample tubes or vials therein. The input fluid in line 44 is composed of a combination of fluids, each at a different, preselected temperature, as present in lines 18, 26 and N3. A plurality of fluid modifiers 16, 24, N1 are provided and are coupled in parallel to a mixer 42.

Typically, the fluid modifiers are chillers and heaters utilizing well-known heat exchangers. It is a significant advantage that the modifiers may use low energy level heat exchange systems since only a constant temperature output is required of any given modifier system, and the ability of the modifier system to change the temperature of the stream to within a specific temperature frame is not a factor. This characteristic of a modifier is referred to as "intrinsic ramp speed", which is the transition time between two target temperatures for the stream flowing out of the modifier. By contrast, the "sample ramp speed" (or just "ramp speed") refers to the transition time or speed during which the test sample is taken from a first target temperature to a second target temperature. It is an important aspect of the subject invention that the sample ramp speed is independent of the intrinsic ramp speed, and that the intrinsic ramp speed of the modifiers is unimportant.

The component fluids produced by the modifiers 16, 24, N1 are introduced into a mixer 42 for combining the fluid in selected ratios to produce a blended fluid stream in line 44. In the preferred embodiment, the mixer is a closed chamber with a input side and an output side and includes a series of control gates for controlling the specific ratio of the component fluid streams introduced into the chamber for producing the blended fluid stream. In order to maintain a constant volumetric flow rate through the fluid modifiers (16, 24, N1), the excess fluid in each component stream is returned to the appropriate modifier via lines 52, 54, N2 respectively. It will be readily understood by those who are skilled in the art that the control gates may be an integral part of the mixer or may be separate, independent units placed in each component fluid stream in advance of the mixer, as is diagrammatically illustrated in FIG. 2.

By mixing the separate component fluids to produce a combined, blended stream of a selected temperature on line 44, the fluid temperature on line 44 can be changed instantaneously, greatly increasing the ramp speed within the chamber 10, and also can blend gradually to produce long ramp time, if desired. As shown in FIG. 2, the blended fluid is continuously exited from chamber 10 via line 46, which is coupled to the respective modifier 16, 24, N1 and respective return lines 52, 54, N2 in order to maintain a constant volumetric flow rate at this point in the system. Any number of modifiers may be used, but a typical system includes a heater (as at modifier 1), a chiller (modifier 2) and possibly an ambient air source (modifier N).

The temperature conditions within chamber 10 may be monitored by a control monitor 11 such as a programmable thermostat or the like. The monitored conditions are then typically introduced into a programmable controller 13 which will function in the well-known manner to control mixing gates or valves associated with the mixer 42 for controlling the blended ratio of the component fluids output at line 44. The ramp times within chamber 10 can thus be increased or decreased, as required, by altering the ratio of fluids in line 44.

A first embodiment is shown in FIG. 2 and includes a first fluid source such as a pump or blower 12 which provides fluid flow, such as a stream of air, at a constant volumetric flow rate. The term "blower" generally refers to a source of movement for a gas such as air, while the term "pump" is generally used for liquid fluids. The resultant first stream of air is introduced via a transfer system such as a conduit 14 into a heating chamber 16. In the preferred embodiment, heating chamber 16 is designed to heat the air to a constant temperature for introduction into the transfer system 18.

Since the heating chamber only has to achieve a constant temperature, the intrinsic ramp speed for the heating chamber is not a factor in the method of the invention. This permits the use of an energy efficient, slow response heat exchanger. The air present in the transfer conduit 18 is at a constant heated temperature, typically substantially higher than the highest target temperature to be achieved in the sample chamber 10.

A second stream of air is provided by means such as the blower 20 and is introduced at a constant volumetric flow rate via the transfer conduit 22 into a chiller 24. Again, since the chilled air is maintained at a constant temperature, the intrinsic ramp time of the chilling or cooling apparatus is not critical. The constant temperature cooled air is then delivered at transfer line 26. Optionally, the chiller is omitted and air at ambient temperature is used in its place.

In the embodiment of FIG. 2, a pair of damper systems 28 and 30 are placed in parallel and each has an input port 32 adapted for receiving the stream in lines 18 and 26, respectively. Each damper also includes an output port 34 and an exhaust or return port 36.

Each damper system has a diverter gate system as diagrammatically illustrated at 38. In operation, treated air from the heater or the chiller enters the respective damper via the input port 32. When the gate 38 is shifted to block exhaust port 36, all air entering the diverter through port 32 is exited through port 34 and into the common conduit 40. It will be recognized that the ratio of chilled air to heated air can be controlled by selectively controlling the position of the respective gates 38. The ratio can vary from zero percent (0%) chilled air and one hundred percent (100%) heated air to zero percent (0%) heated air and one hundred percent (100%) chilled air, since the position of the gates are infinitely variable. This permits the commingled air in the combined fluid stream of conduit 40 to be of any select temperature between the lowest temperature provided by the chilled air and the highest temperature provided by the heated air.

The blowers 12 and 20 are in parallel as are the heater 16 and the chiller 24. The gates 38 are controlled to provide a combined fluid stream exiting through the respective ports 34. This combined or commingled stream is present in the common conduit 40 and is at a constant volumetric flow rate. Thus, the blended stream in line 40 is controlled to generate the entire temperature range required for thermal cycling the samples.

The commingled air stream may next be introduced into an optional mixer 42 where it is blended to produced a homogeneous, controlled temperature fluid flow in line 44. The flow may be controlled through a series of baffles in the manner well known to those who are skilled in the art to assure a smooth flowing, homogeneous flow. This blended stream is introduced via the transfer conduit 44 into the cycling or sampling chamber 10.

In the preferred embodiment, the sample chamber 10 may include means for supporting one or more sample specimens. By way of example, it has been found that suspension of the specimens on a suitable suspension wire or the like minimizes contact of the specimen vials with any potential surface that could act as either an insulator or a heat-sink and affect the ramp up and ramp down times of the specimen during the thermal cycling. In the preferred embodiment, the samples may be suspended in the sample chamber from a suitable hanger such as a wire rack or the like. Suspended sample tubes may also serve adequately as baffles, thereby obviating the mixer 42.

The fluid stream through the sample chamber is exited via the transfer conduit 46. The specimen is continuously in contact with a moving fluid stream having a constant volumetric flow rate with an almost instantaneously variable temperature. The temperature may be rapidly changed by shifting the controlled gates 38 in the damper systems 28 and 30, respectively, the temperature of the fluid stream 44 being nearly instantaneously responsive to the repositioning of the gates. In the embodiment of FIG. 2, the fluid exited from chamber 10 via conduit 46 is introduced to the input sides of the blowers 12 and 20. Likewise, the excess exhaust fluid exhausted via the respective ports 36 of the damper systems 28 and 30 is reintroduced into the fluid stream via recirculating paths 48 and 50, respectively. The recirculation paths are coupled to the exhaust paths 46, as diagrammatically shown at 52 and 54, respectively. The relative intake of blowers 12, 20 from conduit 46 is proportional to the output from each blower which is gated through dampers 28, 30 to the mixer 42 and sample chamber 10, thus maintaining a substantially constant volumetric flow rate throughout the closed system.

An alternative embodiment is shown in FIG. 3. This has been found to be the preferred embodiment of the invention, since the addition of blower 60 has been found to allow the system to operate with a minimum waste of energy in the heater (16) and chiller (24). The additional pump or blower 60 has been inserted in the system in parallel with the pump or blowers 12 and 20, with input from the exhaust system conduit 46 and output being introduced directly into the mixer 42 via the conduit 62, in parallel with the commingled stream from conduit 40.

By providing proper gating or dampening at mixer 42, the blower 60 works in conjunction with the blowers 12 and 20 to permit heated or chilled air to be introduced into the mixer 42 only as required while maintaining a constant volumetric slow rate through the mixer 42 and sample chamber 16. For example, when a sample target temperature has been reached and must be maintained, dampers 28, 30 can both be closed down to exhaust the majority of the output of blowers 12 and 20 through their recycle paths 48 and 50. This causes blower 60 to intake the majority of output from sample chamber 10 via conduit 46, and to re-circulate it back to sample chamber 10 without a temperature adjustment. This process continues until the temperature monitor calls for a decrease or increase in temperature, where upon the chiller damper 30 or heater damper 28 is opened to make the adjustment. It has been found that the addition of blower 60 has a minimum impact on the temperature cycling and response time of the system and allows heated or chilled air to be introduced into the sample chamber 46 only as required.

A third embodiment utilizing a single sample damper 70 is shown in FIG. 4. This embodiment is particularly useful when system cost considerations are a factor. As there shown, the damper 70 includes an ambient air input port 72 and a heated air input port 74. As in the prior embodiments, the blower 12 is associated with the heater 16 via the input conduit 14 for producing heated air in conduit 18 which then is introduced via the input port 74 into the damper 70. In this embodiment, a second blower 80 is adapted for receiving ambient exterior air, as indicated by arrow A for introducing a constant flow of ambient air via conduit 82 into the ambient air input port 72. The damper 70 includes a gate 38 operating in the same manner previously described for controlling the ratio of heated air and ambient air which is output via the output port 84 into the common or blended air conduit 40. The blended air is introduced into the mixer 42, as in the previous embodiments, for producing a blended, having a constant volumetric fluid stream flow rate on conduit 44 for introduction into the sample chamber 10. The exhaust system 46 is connected directly to the heated input blower 12 via conduit 86, with an open exhaust at 88 to the room. Because of the open exhaust 88, this embodiment also operates with a minimum of back pressure, assuring that a constant volumetric flow rate fluid stream is produced. This system is ideal when the lowest temperature the samples must achieve in the cycling chamber 10 is at or above ambient temperature. Of course, it will be understood that a chilled air could be introduced into port 72 of the single damper 70 to lower the low temperature end of the ramp.

Dampers can be any known device. The diverters of the dampers may be controlled by standard equipment, such as stepper motors under computer control.

The drawing figures are diagrammatic only, especially with regard to conduits. In actual construction, such conduits are minimized so as to decrease dead space volume and to assure the essentially instantaneous effect of a gating change in fluid flow.

As mentioned, the pumps or blowers used in this invention should be of a type that moves a constant volume of fluid against a constant backpressure. Such pumps are exemplified by the class of pumps known as "centrifugal" pumps or blowers. They are characterized by an ability to produce a constant volumetric flow, and by an ability to produce an output that varies inversely with the pressure against which they pump. Thus, in FIG. 3 for example, when one desires to raise the temperature of the fluid stream bathing the samples, the gate from the heater 16 is opened to flood the common conduit 40 with heater fluid. This causes blower 60 to encounter increased backpressure and to reduce its output automatically.

Experiments establishing the viability of the system have been performed with good results, wherein the air stream was able to be maintained at a constant velocity of 45.63 CFM, when utilizing a heat gun, model HG501A, available from Master Appliance Company, Racine, Wis., with a maximum temperature of approximately 126° C. at 1,680 watts. The nozzle air velocity was maintained at 3,000 fpm, with a nozzle exit diameter of 1.67 in. to achieve a flow of 24.7 SCFM (standard cubic feet per minute).

The experimental samples contained water in an Eppendorf® brand 0.5 ml. spherical bottom polypropylene microcentrifuge tube with an attached lid, as is standard in the industry. Each tube contained 60 microliters of water.

The lid was drilled to accept a pair of thermocouple wires. The thermocouple used was Omega PN TT-T-30, T Type, 0.010 inch wire diameter. The junction at the cap was welded with a weld bead diameter of approximately 0.030 inches. The junction was positioned at approximately the center of the liquid in the tube. An Omega Digital Thermometer, Model HH-73T, was used to monitor the sample temperature. During the experiment, the sample temperature was at an initial temperature of 22° C. and could be brought to a peak temperature of 100° C. in a period of approximately thirty (30) seconds. The vial could then be cooled from the peak temperature of 100° C. to the initial temperature of 22° C. in a period of approximately 4.5 minutes using ambient air as the cooling medium.

It was further established by increasing the heated temperature level to a level five times higher than the target temperature and bringing the chamber temperature to a level initially higher than the target temperature for the vial, that the ramp speed could be substantially increased. By injecting 126° C. air into the chamber, the sample could be heated from 50° C. to 85° C. within 12 to 15 seconds. Likewise, by injecting cooling air at a substantially lower temperature than the target temperature, for example, 22° air, the sample was cooled from 85° C. to 50° C. in approximately 60 to 75 seconds, greatly increasing the cooling ramp speed.

In the exemplary embodiments, it is contemplated that a fluid surface area of the sample chamber will be constructed of a material having minimum "heat sink" characteristics, further assuring that the cycling chamber 10 is quickly responsive to a change in gate position by gates 38 of the dampers 28 and 30. Of course, insulation and selection of materials have an important role in these issues.

Figure 5:
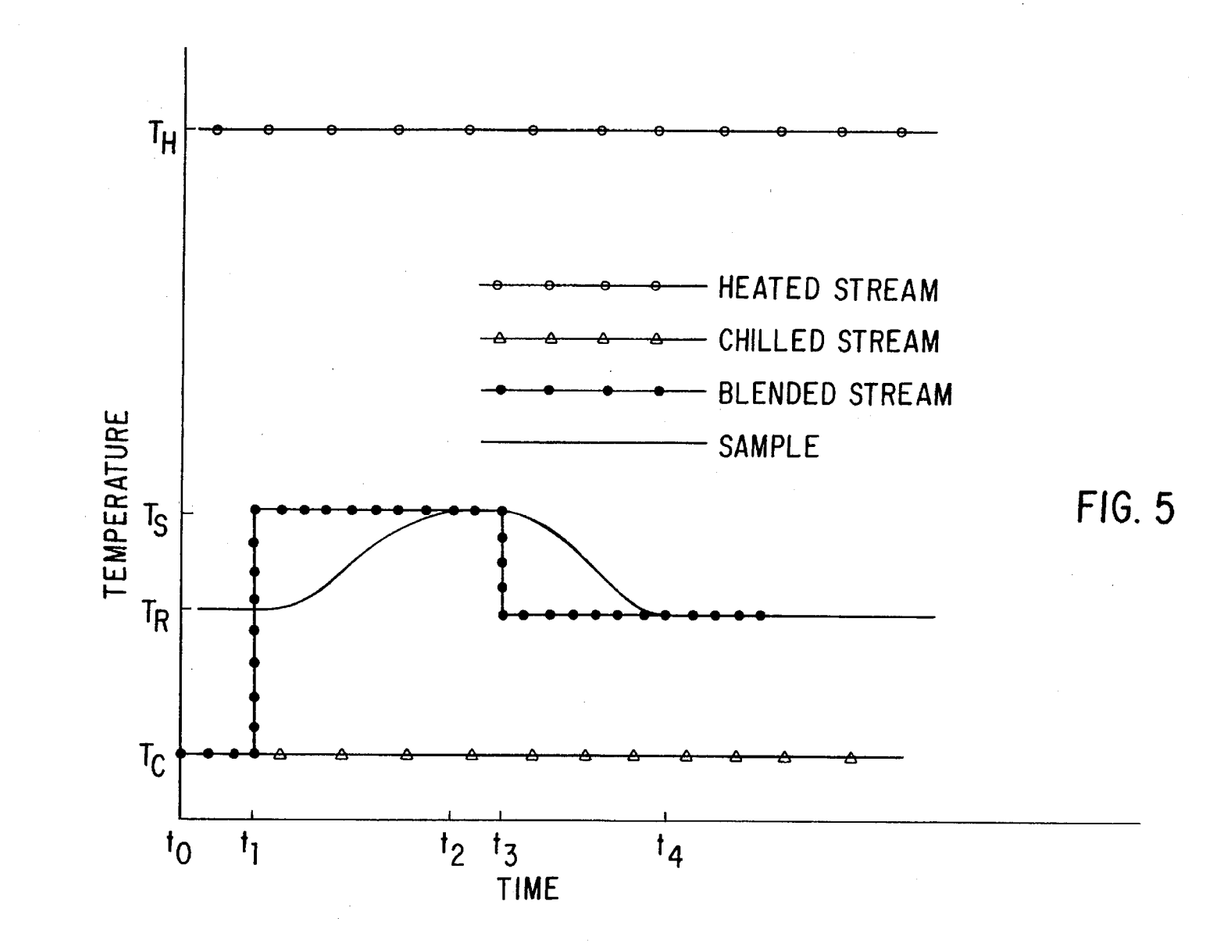
FIG. 5 is a typical phase diagram for controlling the heating and cooling cycle of a sample using the subject invention in a normal mode.
Figure 6:
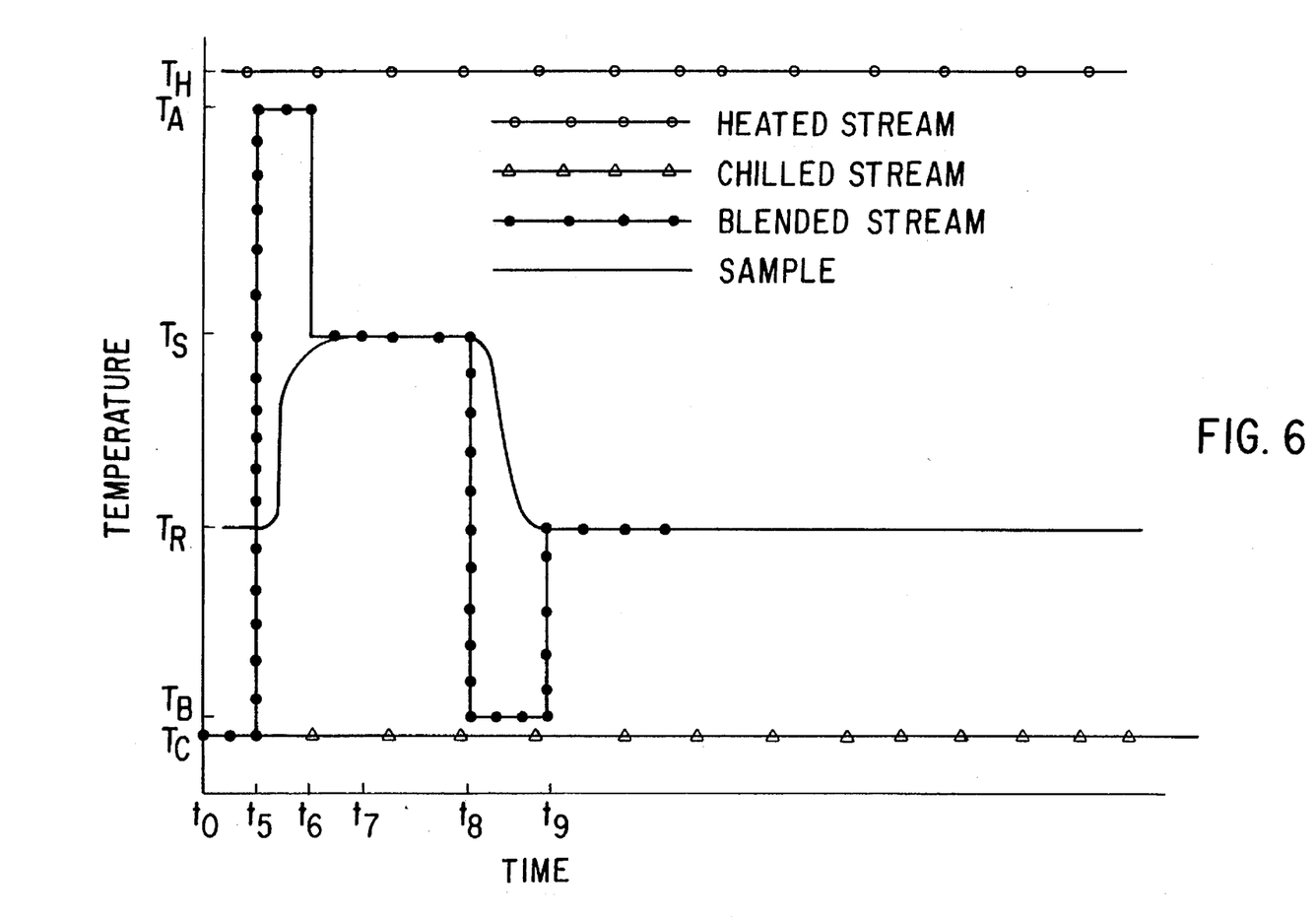
FIG. 6 is a phase diagram for controlling the heating and cooling of a sample using the subject invention in a superheating and/or supercooling mode.

Phase diagrams demonstrating operating cycles for the thermal cycling system as described herein are illustrated in FIGS. 5 and 6. With specific reference to FIG. 5, the temperature axis is vertical and the time duration is shown on the horizontal line. TR represents room temperature and is presumed to be the initial temperature of the sample. In the example illustrated, the chilled air is at a constant temperature substantially below room temperature, as indicated by TC. The heated air stream is at a constant temperature substantially above room temperature, as indicated by TH.

It will be understood that in certain applications, ambient room temperature air may be utilized in lieu of the chilled air or the heated air or in combination with both streams. Using FIG. 2 as an example, the sample is placed in the chamber 10 at time t0, at room temperature TR. The thermal cycling is then initiated at time t0 by adjusting the baffle gates 38 in dampers 28 and 30 to produce a blended air stream of a temperature corresponding to the target sample temperature TS. The sample temperature then begins to rise, as indicated and reaches the target temperature TS at time t2. The sample will be maintained at this temperature for as long as the blended air stream is held at the target level, or until t3. When the sample has been heated for the appropriate period of time as indicated at t3, the baffle gates in dampers 28 and 30 are adjusted to bring the blended air stream temperature down to either room temperature TR or another selected temperature and the sample begins to cool down, reaching the lower blended air stream temperature at time 14, where it will stay until the temperature of the blended air stream is again adjusted or the sample is removed from the sample chamber 10.

A super heating and/or super cooling cycle is illustrated in FIG. 6. This cycle method is useful when fast ramp up and ramp down times are desirable. Again using the embodiment of FIG. 2 as an example, a sample is placed in chamber 10 at room temperature TR at time t0. The cycle begins at time t5, when the baffle gates in dampers 28 and 30 are adjusted to produce a blended air stream at a temperature TA, which is substantially higher than the target sample temperature TS. Of course, TA may be as high as TH. The sample temperature begins to rapidly rise in response to its contact with the super heated air. As the sample temperature approaches the target temperature TS, the baffles are adjusted to reduce the blended air temperature to TS as indicated at time t6, with the sample reaching target temperature TS at time t7. The sample will stay at this temperature for as long as the blended air is maintained at the target temperature TS, or until t8, as indicated. Where it is desired to rapidly cool the sample, the blended air can be adjusted to a super cooled to a temperature TB, substantially below room temperature TR as indicated at time t8. TB may be as low as TC. As the sample approaches room temperature TR or another preselected final temperature, the blended air temperature is adjusted as indicated at time t9.

The method as demonstrated in FIG. 6 relies on the natural hysteresis of the sample to permit either or both super heating and super cooling to maximize ramp times. Specifically, by overshooting the target sample temperature TS, the transition time between TR and TS is greatly accelerated. This may be utilized to quickly elevate the sample temperature as between time points t5 and t6 and/or to quickly reduce sample temperature as between t8 and t9. This permits the cycling of samples requiring quick temperature change, utilizing constant temperature streams as indicated by TH and TC. The gap between times t6 and t7 and/or between t8 and t9 is dictated by the natural hysteresis of the sample. Typically, a greater difference between the target sample temperature TS and the overshoot temperature TA or TC results in a faster ramp speed., This method not only permits control of the sample temperature throughout the cycle but also permits control of the transition time between a plurality of target points.

While certain features and embodiments of the invention have been described in detail herein, it will be readily apparent that the invention encompasses all modifications and enhancements within the scope and spirit of the following claims.

What is claimed is:

1. A method for thermal cycling a sample comprising the steps of:

a. directing the flow of a composite stream into the environment of a sample to achieve a first sample-target-temperature, wherein said composite stream is composed of a plurality of component fluid streams each from a distinct source and each maintained at a different constant temperature;

b. maintaining said first sample-target-temperature for a preselected period;

c. adjusting said composite stream to achieve a second sample-target-temperature wherein when said first sample-target-temperature is less than said second sample-target-temperature, a sample-ramp-speed of at least 1.0° C./second is achieved, and wherein said adjusting is achieved by selectively blending in varying ratios said component fluid streams; and d. maintaining said second sample-target-temperature for a preselected period.

2. The method of claim 1 wherein said composite stream of step (a) has a temperature substantially the same as said first sample-target-temperature.

3. The method of claim 1 wherein said composite stream of step (a) initially has a temperature disparate from said first sample-target-temperature and after said sample substantially achieves said first sample-target-temperature, said composite stream is altered to a temperature substantially the same as said first sample-target-temperature.

4. The method of claim 3 wherein said composite stream of step (a) has an initial temperature that is greater than said first sample-target-temperature.

5. The method of claim 3 wherein said composite stream of step (a) has an initial temperature that is less than said first sample-target-temperature.

6. The method of claim 1 wherein said adjusted composite stream of step (c) has a temperature substantially the same as said second sample-target-temperature.

7. The method of claim 1 wherein said adjusted composite stream of step (c) initially has a temperature disparate from said second sample-target-temperature and after said sample substantially achieves said second sample-target-temperature said adjusted composite stream is altered to a temperature substantially the same as said second sample-target-temperature.

8. The method of claim 7 wherein said adjusted composite stream of step (c) has an initial temperature that is greater than said second sample-target-temperature.

9. The method of claim 7 wherein said adjusted composite stream of step (c) has an initial temperature that is less than said second sample-target-temperature.

10. The method of claim 1 wherein said plurality of component fluid streams comprises at least one component fluid stream at a temperature higher than ambient temperature.

11. The method of claim 10 wherein said plurality of component fluid streams further comprises at least one component fluid stream at a temperature lower than ambient temperature.

12. The method of claim 1 wherein said plurality of component fluid streams comprises one component fluid stream at a temperature lower than ambient temperature.

13. The method of claim 1, herein said plurality of component fluid streams are air.

14. The method of claim 1 wherein said sample contains nucleic acids.

15. The method of claim 1 wherein said plurality of component fluid streams comprises three component streams wherein one component fluid stream is at a temperature higher than ambient temperature one component fluid stream is at a temperature lower than ambient temperature and one component fluid stream is fluid which has exited from said sample environment and is recirculated into said sample environment.

16. The method of claim 15 wherein said first sample-target-temperature is maintained by recycling said composite stream of step (a) into the environment of said sample.

17. The method of claim 15 wherein said second sample-target-temperature is maintained by recycling the adjusted composite stream of step (c) into the environment of said sample.

18. The method of claim 1 wherein a sequence of said first sample-target-temperature and said second sample-target-temperature is repeatedly achieved.

19. A method for thermal cycling nucleic acids comprising the steps of:
 a. directing the flow of a composite air stream into the environment of a sample of nucleic acids to achieve a first nucleic acid target-temperature, wherein said composite air stream is composed of a plurality of component air streams each from a distinct source and each maintained at a different constant temperature;
 b. maintaining said first nucleic acid target-temperature for a preselected period;
 c. adjusting said composite air stream to achieve a second nucleic acid target-temperature wherein when said first nucleic acid target-temperature is less than said second nucleic acid target-temperature, a sample-ramp-speed of at least 1.0° C./second is achieved, and wherein said adjusting is achieved by selectively blending in varying ratios said component air streams; and
 d. maintaining said second nucleic acid target-temperature for a preselected period.

20. The method of claim 19 wherein said composite air stream of step (a) has a temperature substantially the same as said first nucleic acid target-temperature.

21. The method of claim 19 wherein said composite air stream of step (a) initially has a temperature greater than said first nucleic acid target-temperature and after said sample substantially achieves said first nucleic acid target-temperature, said composite air stream is altered to a temperature substantially the same as said first nucleic acid target-temperature.

22. The method of claim 19 wherein said adjusted composite air stream of step (c) has a temperature substantially the same as said second nucleic acid target-temperature.

23. The method of claim 19 wherein said adjusted composite air stream of step (c) initially has a temperature lower than said second nucleic acid target-temperature and after said sample substantially achieves said second nucleic acid target-temperature, said adjusted composite stream has a temperature substantially the same as said second nucleic acid target-temperature.

24. The method of claim 19 wherein said plurality of component air streams comprises at least one component air stream at a temperature higher than ambient temperature.

25. The method of claim 24 wherein said plurality of component air streams further comprises at least one component air stream at a temperature lower than ambient temperature.

26. The method of claim 19 wherein said plurality of component air streams comprises one component air stream at a temperature lower than ambient temperature.

27. The method of claim 19 wherein said plurality of component air streams comprises three component air streams wherein one component air stream is at a temperature higher than ambient temperature, one component air stream is at a temperature lower than ambient temperature and one component air stream is air which has exited from said sample environment and is recirculated into said sample environment.

28. The method of claim 27 wherein said first nucleic acid target-temperature is maintained by recycling said composite air stream into the environment of said sample of nucleic acids.

29. The method of claim 27 wherein said second sample-target-temperature is maintained by recycling the adjusted composite air stream into the environment of said sample of nucleic acids.

30. The method of claim 19 wherein a sequence of said first nucleic acid target-temperature and said second nucleic acid target-temperature is repeatedly achieved.

\* \* \* \* \*

UNITED STATES PATENT AND TRADEMARK OFFICE
CERTIFICATE OF CORRECTION

PATENT NO. : 5,576,218
DATED : November 19, 1996
INVENTOR(S) : Zurek, et. Al.

It is certified that error appears in the above-indentified patent and that said Letters Patent is hereby corrected as shown below:

Column 11, line 28, change "herein" to --wherein--.

Signed and Sealed this

Twenty-ninth Day of April, 1997

Attest:

BRUCE LEHMAN

*Attesting Officer*      *Commissioner of Patents and Trademarks*